US 12,154,546 B2

United States Patent
Gowayyed et al.

(10) Patent No.: US 12,154,546 B2
(45) Date of Patent: *Nov. 26, 2024

(54) METHOD AND SYSTEM FOR ACOUSTIC MODEL CONDITIONING ON NON-PHONEME INFORMATION FEATURES

(71) Applicant: SoundHound, Inc., Santa Clara, CA (US)

(72) Inventors: Zizu Gowayyed, San Francisco, CA (US); Keyvan Mohajer, Los Gatos, CA (US)

(73) Assignee: SoundHound AI IP, LLC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,259

(22) Filed: Jul. 6, 2023

(65) Prior Publication Data

US 2023/0352000 A1    Nov. 2, 2023

Related U.S. Application Data

(63) Continuation of application No. 17/224,967, filed on Apr. 7, 2021, now Pat. No. 11,741,943.

(Continued)

(51) Int. Cl.
*G10L 15/00* (2013.01)
*G10L 15/02* (2006.01)
(Continued)

(52) U.S. Cl.
CPC ............. *G10L 15/02* (2013.01); *G10L 15/04* (2013.01); *G10L 15/16* (2013.01); *G10L 15/22* (2013.01);
(Continued)

(58) Field of Classification Search
CPC combination set(s) only.
See application file for complete search history.

(56) References Cited

U.S. PATENT DOCUMENTS

| 9,613,624 B1 | 4/2017 | Kramer et al. |
| 10,381,017 B2 | 8/2019 | Zhang et al. |

(Continued)

FOREIGN PATENT DOCUMENTS

| CN | 103632667 A | 3/2014 |
| CN | 108932944 A | 12/2018 |

(Continued)

OTHER PUBLICATIONS

Allowance Notice with search report by the China Patent Office of the corresponding Chinese patent application No. 202110452098.4, dated Jan. 4, 2024.

(Continued)

*Primary Examiner* — Vu B Hang
(74) *Attorney, Agent, or Firm* — Platinum Intellectual Property PC

(57) ABSTRACT

A method and system for acoustic model conditioning on non-phoneme information features for optimized automatic speech recognition is provided. The method includes using an encoder model to encode sound embedding from a known key phrase of speech and conditioning an acoustic model with the sound embedding to optimize its performance in inferring the probabilities of phonemes in the speech. The sound embedding can comprise non-phoneme information related to the key phrase and the following utterance. Further, the encoder model and the acoustic model can be neural networks that are jointly trained with audio data.

20 Claims, 14 Drawing Sheets

Related U.S. Application Data

(60) Provisional application No. 62/704,202, filed on Apr. 27, 2020.

(51) Int. Cl.
*G10L 15/04* (2013.01)
*G10L 15/16* (2006.01)
*G10L 15/22* (2006.01)
G10L 15/08 (2006.01)
G10L 25/30 (2013.01)

(52) U.S. Cl.
CPC ........ *G10L 2015/025* (2013.01); *G10L 15/08* (2013.01); *G10L 25/30* (2013.01)

(56) References Cited

U.S. PATENT DOCUMENTS

| | | | |
|---|---|---|---|
| 10,573,312 | B1 | 2/2020 | Thomson et al. |
| 11,741,943 | B2 * | 8/2023 | Gowayyed .............. G10L 15/02 704/232 |
| 2017/0270919 | A1 | 9/2017 | Parthasarathi et al. |
| 2019/0043481 | A1 | 2/2019 | Georges et al. |
| 2019/0103124 | A1 | 4/2019 | Zhang et al. |
| 2020/0066271 | A1 | 2/2020 | Li et al. |
| 2020/0090657 | A1 | 3/2020 | Czarnowski et al. |

FOREIGN PATENT DOCUMENTS

| | | |
|---|---|---|
| CN | 110085217 A | 8/2019 |
| CN | 110556097 A | 12/2019 |
| CN | 110619871 A | 12/2019 |
| GB | 201013730 | 9/2010 |
| JP | 2015049254 A | 3/2015 |
| WO | 2013110125 A1 | 8/2013 |

OTHER PUBLICATIONS

Joanna Równicka et al., Analyzing deep CNN-based utterance embeddings for acoustic model adaptation, 2018 IEEE Spoken Language Technology Workshop (SLT), Feb. 14, 2019.

EPO Extended Search Report of EP application No. 21170780, dated Sep. 10, 2021.

First office action with search report by the China Patent Office of the corresponding Chinese patent application No. 202110452098.4, dated Jun. 12, 2023.

Guan-Lin Chao et al: "Deep Speaker Embedding for Speaker-Targeted Automatic Speech Recognition", Natural Language Processing and Information Retrieval, ACM, 2 Penn Plaza, Suite 701 New York, NY10121-0701, USA, Jun. 28, 2019, pp. 39-43, XP058440221, DOI: 10.1145/3342827.3342847, ISBN: 978-1-4503-6279-5.

King Brian et al: Robust Speech Recognition via Anchor Word Representations, Interspeech 2017, [Online] Aug. 20, 2017, pp. 2471-2475, XP055827813, ISCA DOI: 10.21437/Interspeech.2017-1570.

Zhao Yong et al: "Domain and Speaker Adaptation for Cortana Speech Recognition", 2018 IEEE International Conference on Acoustics, Speech and Signal Processing (ICASSP). IEEE, Apr. 15, 2018, pp. 5984-5988, XP033400879, DOI: 10.1109/ICASSP.2018.8461553.

* cited by examiner

| INFORMATION CONTENT | | |
|---|---|---|
| Utterance audio | Key phrase audio | Acoustic model output |
| phonemes | | phonemes |
| voice | voice | |
| accent | accent | |
| environment | environment | |

*FIG. 3*

METHOD AND SYSTEM FOR ACOUSTIC MODEL CONDITIONING ON NON-PHONEME INFORMATION FEATURES

CROSS-REFERENCE TO RELATED APPLICATION

This application claims priority to U.S. Provisional Application No. 62/704,202, entitled "Acoustic Model Conditioning on Sound Features" filed on Apr. 27, 2020, the content of which is expressly incorporated by reference herein in its entirety.

TECHNICAL FIELD

The present subject matter is in the field of speech processing and recognition, particularly automatic speech recognition (ASR).

BACKGROUND

Natural language speech interfaces are emerging as a new type of human-machine interface. Such interfaces' application in transcribing speech is expected to replace keyboards as a fast and accurate way to enter text, and their application in supporting natural language commands will replace mice and touch screens to manipulate non-textual controls. In summary, natural language speech interfaces in the context of natural language processing will provide clean, germ-free ways for humans to control machines for work, entertainment, education, relaxation, and assistance with menial tasks.

However, the limited accuracy of speech recognition is the bottleneck of natural language speech processing to fulfill those benefits. For example, getting words wrong can sometimes be funny such as capturing "thirty-three" in an Irish accent as "dirty tree." In some cases, it can be frustrating such as capturing "text mom" from a noisy car as "text tom," "text none," "text some." In some cases, speech recognition errors can be dangerous such as capturing a high-voiced doctor's dictated medical diagnosis of aphasia as aphagia!

FIG. 1 shows a scenario of speech recognition failure in the context of virtual assistants. A user 10 is a person with a unique vocal tract, who speaks with a New Zealand accent, and is located in a noisy room with rain falling on a window 11. User 10 calls out 12 for a virtual assistant 13 to predict whether it will rain tomorrow in Auckland, the capital city of New Zealand. The virtual assistant 13 from a company in the San Francisco Bay area recognizes the word Auckland as the Bay area city Oakland and gives a useless response 14 about the weather there. Another virtual assistant 15 from a company in the US Northwest recognizes the word Auckland as Falkland, a city in Western Canada and also gives a useless response 16.

For speech with uncommon accents, uncommon voice types, in uncommon environmental conditions such as with noise, background voices, or music, using uncommon devices, and in other uncommon scenarios, conventional speech recognition suffers accuracy problems that make them suited only for narrow uses such as playing music in quiet homes. Only by solving these problems will products with voice interfaces reach their full potential in daily life.

SUMMARY OF THE INVENTION

Acoustic model conditioning on sound features, or conditional acoustic models, can provide a simple and powerful technique that greatly improves the accuracy of automatic speech recognition (ASR).

According to some embodiments, conditional acoustic models can substantially improve the speech recognition accuracy in those uncommon use cases of voice types, accents, environmental conditions, and so forth. In particular, such models can provide the advantages such as making ASR accurate even with background noise, music, or speech.

Many ASR systems can use neural networks trained on data. The neural network architectures vary widely in terms of their numbers of layers, number of nodes, convolutions, recurrence, and training methods. The present subject matter provides benefits to ASR accuracy regardless of the specific neural network architectures used. Furthermore, by offering improved accuracy, an ASR system can be trained to meet a required accuracy specification with less time and less training data than would be needed for conventional ASR approaches. This enables providers of speech recognition products and services to develop new features and bring them to market faster, improving their competitive market position and overall profitability.

These benefits to ASR can be realized within virtual assistants that wake up in response to a key phrase as in the example of FIG. 1, but also in systems for dictation, vehicle control interfaces, retail vending systems, and any other application of voice interfaces that recognize commonly-spoken known key phrases.

Acoustic models (AM) are methods and key components of computerized systems for ASR. In particular, AMs infer the probabilities of phonemes in speech audio. Conditional acoustic models can rely on encoding a sound embedding from a first segment of speech of a key phrase with a known sequence of phonemes. In the present subject matter, sound embedding can involve projecting an audio input representation into another more convenient or lower dimensional representation space. The first segment of audio may be as little as a few samples of audio or a single spectral frame or might be as much as a string of several words. The encoded feature vectors can be computed and stored immediately or shortly after the end of the first segment of audio.

The conditional acoustic model then can generate inference of phoneme probabilities on a second segment of speech audio, containing an utterance that shortly follows the key phrase audio. The inputs to the AM are both the utterance segment of speech audio and sound embedding including the stored feature vectors. The output is a probability of at least one set of phonemes, or a SoftMax set of probabilities for each of a set of phonemes.

Some implementations can use a neural network for the acoustic model and train the neural network on labeled samples of speech audio, each sample having a corresponding key phrase sound embedding. This correspondence can ensure that the effect of the sound embedding on the learned predictions of the AM will be in the right direction and proportion for each training data sample.

To support a diverse range of users in ASR systems, training the systems with diverse voice and accent data can improve the accuracy of inference. For example, the training samples can include a multiplicity of voices and a multiplicity of accents. Furthermore, further optimization of the inference accuracy can be achieved by mixing the training data with noise audio samples. In addition, it is preferred to use noise audio samples having the same or substantially similar noise profile for mixing with the key phrase audio and the training utterance.

Various types of encoders can be utilized in the present subject matter. According to some embodiments, an encoder can be carefully programmed. According to some other embodiments, the encoder can be a model learned from data, such as neural networks. Some embodiments can use a pre-trained model for the encoder. According to some embodiments, the encoder model can be trained jointly with the acoustic model. This can include backpropagation of acoustic model gradients to the neural network nodes within the encoder model. Joint training of the encoder model and AM will generally provide optimized accuracy. This is because the encoder model, from learning the outputs of the trained AM model, can learn how to improve a sound embedding that provides more efficient training to the AM model.

According to some embodiments, the ASR system can have one or more jointly trained and one or more independently trained encoding model encode and store sound embeddings from key phrase audio and provide the encodings as inputs to the acoustic model.

According to some embodiments, the ASR system can have the encoder and the acoustic model in different devices. For example, a client device with a microphone and computerized code to run a key phrase spotter can also compute an encoding of the key phrase. It can then transmit the following second segment of audio, having an utterance, with the encoded feature vectors, to an ASR server that runs a conditional acoustic model. According to some embodiments, server-based ASR can provide high accuracy with low cost and power consumption requirements at user devices.

According to some embodiments, the ASR system can also encode the sound embedding and use it in a conditional acoustic model all within the same system. That may be a server that receives the key phrase audio and the following utterance audio segment with an utterance. For example, the system may be contained entirely within a user device such as an automobile or a mobile handset that can perform ASR in "airplane mode" without a network connection.

DESCRIPTION OF DRAWINGS

FIG. 3 shows a table of information within general and processed speech audio;

DETAILED DESCRIPTION

The following text describes various design choices for relevant aspects of conditional acoustic models. Except where noted, design choices for different aspects are independent of each other and work together in any combination.

Acoustic models for ASR take inputs comprising segments of speech audio and produce outputs of an inferred probability of one or more phonemes. Some models may infer senone probabilities, which are a type of phoneme probability. In some applications, the output of an acoustic model is a SoftMax set of probabilities across a set of recognizable phonemes or senones.

Some ASR applications run the acoustic model on spectral components computed from frames of audio. The spectral components are, for example, Mel-frequency Cepstral Coefficients (MFCC) computed on a window of 25 milliseconds of audio samples. The acoustic model inference may be repeated at intervals of every 10 milliseconds, for example. Other audio processing procedures, e.g., Short-Time Fourier Transform (STFT), can also be utilized for generating preferred or selected spectral components for the present subject matter. The spectral components can be computed from samples of an audio waveform, such as one captured by a microphone as part of the user interface of a speech-controlled device. Alternatively, acoustic models can be trained to take such samples directly as input.

A single system or device may include more than one acoustic model. A simple one may be sufficient for a phrase spotter that merely asserts a trigger signal when a key phrase is spoken. An acoustic model for high accuracy speech recognition may use a neural network with as many layers and nodes as are practical to implement within a reasonable budget of resources available in real-time on high-performance computer processors or even non-real-time for analyzing recorded speech. Some acoustic models may be designed at intermediate levels of accuracy to fit within the processing power budgets of portable battery-powered devices for reasonable vocabulary sizes.

Some acoustic models may compute convolutions of input features to take advantage of the information at different levels of granularity that can improve inference accuracy. Some acoustic models may employ recurrences, such as long short-term memory (LSTM) or gated recurrent unit (GRU) neural network nodes to take advantage of the information contained in temporal variations of input signals.

Figure 1:
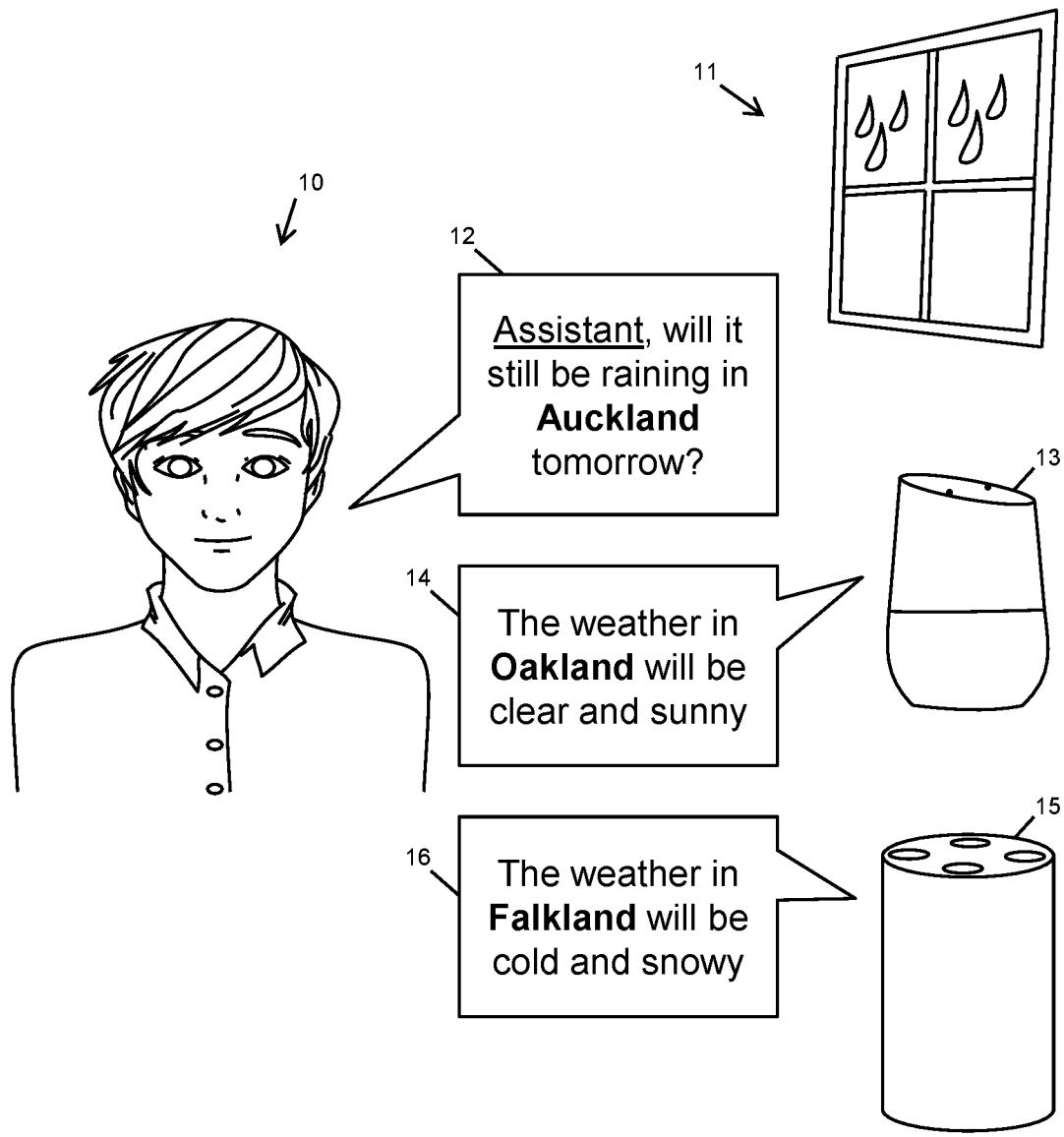
FIG. 1 shows speech recognition failures in conventional systems.
Figure 2:
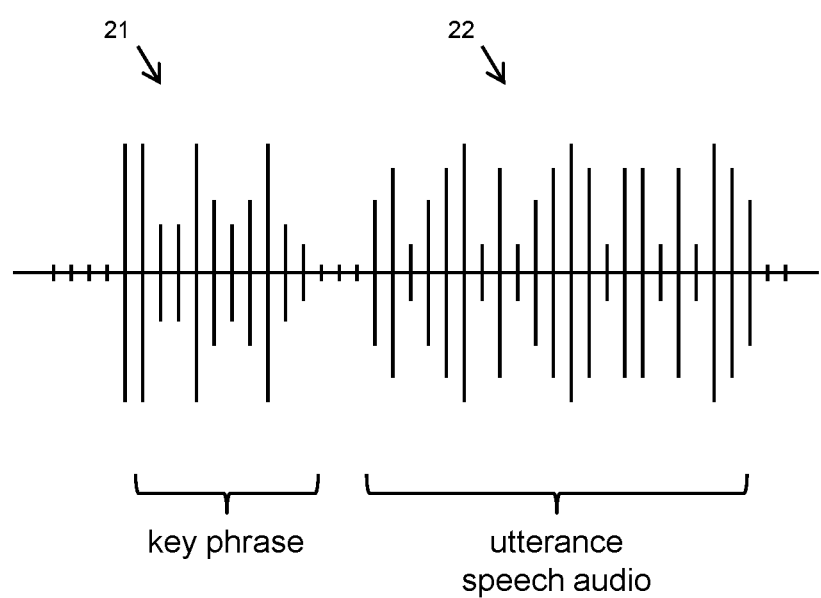
FIG. 2 shows a waveform of speech audio having a key phrase and an utterance.

FIG. 2 shows an example speech waveform. It comprises a first segment of speech 21 in which a speaker spoke a key phrase. A key phrase is a phrase with known words and, therefore, a known sequence of phonemes. Key phrases are useful, for example, to wake up a voice virtual assistant that recognizes and responds to short utterances that are queries or commands. Some examples are "Okay Google" and "Alexa." Key phrases also occur as voice commands in speech used to control systems that perform automatic dictation. Some examples are "period", "newline", and "undo that".

Following the key phrase 21 in the speech waveform is a second segment of speech 22, which is an utterance. The utterance is speech of unknown words and phonemes. An objective of conditional acoustic models is to provide high accuracy in ASR of users' utterances.

FIG. 3 shows a table of the information contained in different representations of speech audio. The audio of utterances, in general, includes information about the phonemes being spoken. It also contains various non-phoneme information such as the voice of the speaker and the physiology of the speaker's vocal tract, which could also be used for purposes such as estimating the gender and age of the speaker. Utterance audio also includes information about the speaker's accent, speech speed, and other attributes of how a speaker turns their thoughts into speech. Utterance audio also includes information about the environment, such as continuous background noises like motors and wind and other distortional parameters affecting the transfer function between the air pressure waves that are sound to the digitally captured representation of that sound.

All this information can be represented by non-phoneme information features. Examples of such non-phoneme information features include the physical attributes of a speaker's voice, attributes of a speaker's accent, a speaker's speech style, and attributes of a speaker's environment such as background noise, reverberation, the transfer function of microphone and analog to digital converter.

Key phrase audio can include all of this information of non-phoneme features. As long as a system correctly identifies that the key phrase is spoken, the phonemes within the key phrase are known a priori and therefore are redundant information contained in the speech audio. That is because a key phrase has a known set of phonemes.

By contrast, the desired output of an acoustic model is phonemes. A well-created acoustic model can reject or filter voice, accent, and environmental information from speech audio and outputs only the phonemes that were spoken.

When, as in the example of FIG. 2, a key phrase 21 is shortly followed by an utterance 22, the voice, accent, and environment information are very likely to be approximately the same between the key phrase audio and the utterance audio. Therefore, by analyzing features of key phrase audio, and representing them in an appropriate encoding, an encoder can send them to a conditional acoustic model that can reject or filter out those features and thereby more accurately identify the features of the speech audio that represent phonemes.

Both the step of encoding features from key phrase audio and the step of inferring phonemes using an acoustic model can be done by carefully constructed digital signal processing algorithms or by training one or more models, such as neural networks, on a large and diverse set of data, or a combination of both signal processing and trained models. A trained conditional acoustic model is trained to have an input of the encoded key phrase audio features. A model for recognizing and encoding features of key phrase audio can be trained independently or trained jointly with the acoustic model.

In systems that support different types of devices or environments, such as a cloud ASR system that supports far-field devices like smart speakers and near-field devices like mobile handsets, it can have multiple acoustic models. Similarly, systems that support ASR for different languages or regions may have multiple acoustic models. It can use an encoder to create an output that simply selected between acoustic models that it estimates will be most appropriate.

The encoded voice, accent, and environmental information from a key phrase are represented as a sound embedding. Sound embeddings capture non-phoneme information about the physical attributes of a speaker's voice, attributes of their accent and speech style, and attributes of their environment such as background noise, reverberation, and the transfer function of microphone and analog to digital converter. In other words, a sound embedding includes information indicating at least one of: the physical attributes of a speaker's voice; attributes of a speaker's accent; a speaker's speech style; and attributes of a speaker's environment (background noise, reverberation, the transfer function of microphone and analog to digital converter, etc.) By capturing sound embeddings for a key phrase, sound embeddings are immune to the variations between phrases and mostly immune to variations due to context and sentiment. By capturing sound embeddings shortly before an utterance, they do not suffer variation due to different device characteristics or different variations of voices due to temperature, emotion, health, and other bodily factors.

Sound embeddings are different from feature vectors used for speaker recognition such as ones used for call center security purposes. Such speaker recognition feature vectors intend to reject environmental information so as to be immune to environmental variations and variations across time and capture devices. Such systems accomplish that by asking a speaker to repeat a phrase multiple times or employ other techniques to discriminate the speaker's voice from environmental information.

Sound embeddings are also different from the speaker ID information used for diarization, which are phrase independent. They use phrase-independent algorithms that compensate for the fact that the phoneme content of speech is unknown.

Sound embeddings are in a space that includes environmental information but not phonetic information. Such spaces can be learned through the process of training an encoder. In such a case, the training would include many voices, accents, and environmental variations but all while saying the pre-defined key phrase phonemes.

Learning a sound embedding space is comparable to learning a phrase-dependent i-vector or x-vector space from data. For example, it is not necessary to train on data labeled in categories such as by gender, accent, or noise. The embedding space learns that information. For a system that does not use joint training between an encoder and a conditional acoustic model, the system can use an off-the-shelf or third-party encoder model such as one for x-vectors or i-vectors.

Figure 4A:
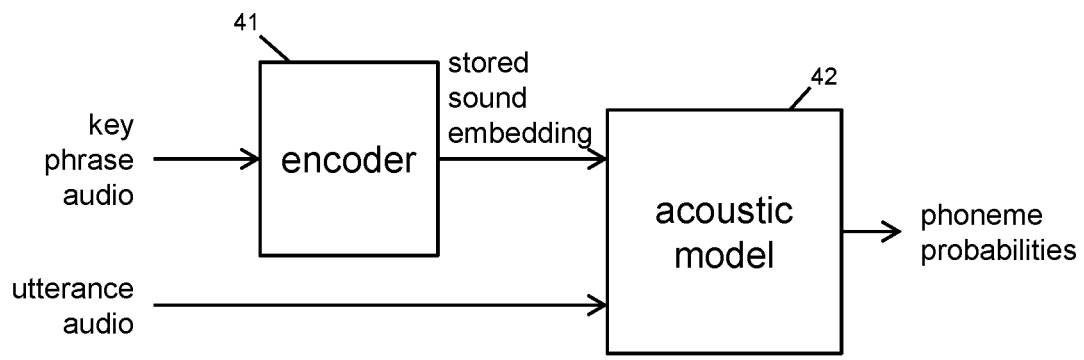
FIG. 4A shows a diagram of an encoder and a conditional acoustic model according to an embodiment.

FIG. 4A shows a diagram of acoustic model conditioning on sound features. An encoder or an encoder model can be a neural network, a statistic module, an algorithm or program configured to process, transform, or compress audio data into lower-dimensional representation as a sound embedding. The sound embedding is a representation of the original audio data, which only focuses on the most important or relevant attributes/features. According to some embodiments, the sound embedding is a representation of the original audio data which only focuses on the non-phoneme information features of the key phrase, such as noise, accent, and environmental attributes. The encoder 41 receives key phrase audio and computes a sound embedding. At or near the end of the key phrase, the sound embedding is stored at a memory device.

The encoder may operate on as little as a few milliseconds of audio. It may operate on a segment of audio buffered from a constant period of time, such as 0.2 or 1.0 seconds before a phrase spotter is triggered. The encoder may operate on a segment of audio beginning at, shortly before, or shortly after a time when a voice activity detector (VAD) triggers as detecting speech until a time at, shortly before, or shortly after a phrase spotter is triggered. The encoder may operate on a segment of audio beginning shortly after a recognized word that is not a key phrase completes until at, shortly before, or shortly after a key phrase is recognized. The encoder may operate on a segment of non-speech audio from when VAD ends until VAD begins. Various mechanisms can be utilized for segmenting the key phrase audio for an encoder to use. It is important that the encoder predominantly analyze sound that includes voice, accent, and/or environmental information but not speech of a priori unknown phonemes.

In FIG. 4A, a conditional acoustic model 42 takes in utterance audio and the stored sound embedding and infers phoneme probabilities. The stored sound embedding remains unchanged and is only replaced when a new key phrase is detected and the encoder 41 runs again to regenerate the sound embedding or when a session ends or a long period of time elapses after which the speaker or environment might have changed.

In the case of a jointly trained encoder and conditional acoustic model, a single well-trained encoder can generally be the most efficient use of computing resources for the accuracy improvement achieved. However, for some implementations, it can be beneficial to use pre-trained encoders, such as off-the-shelf ones, ones from different codebases, or ones optimized for specific applications. This can provide modularity to customize a system for different applications with minimal retraining work.

Figure 4B:
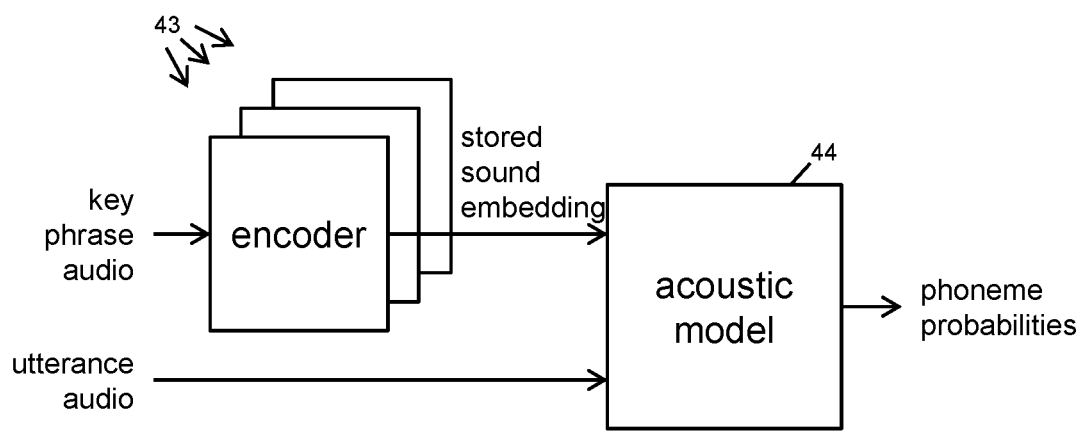
FIG. 4B shows a diagram of multiple encoders and a conditional acoustic model according to an embodiment.

It can also be advantageous to have more than one encoder. This is useful, for example, to have a general sound embedding encoder useful across many applications or languages and then modular encoders to improve accuracy for specific applications or languages. A simple example of such would be a system having a gender detection encoder and a language detection encoder, each encoding a sound embedding for the key phrase that are useful inputs to a conditional acoustic model There is theoretically no limit to the number of encoders that can be used and the number of sound embeddings that can be used as inputs to a conditional acoustic model. Each outputs a vector of 1 or more dimensional values by processing the key phrase speech audio. FIG. 4B shows a diagram of acoustic model conditioning on sound embedding using multiple encoders 43 that create multiple sound embedding. The multiple sound embedding can be stored at the end of processing a key phrase and then used as inputs to a conditional acoustic model 44 that operates on utterance audio to predict phoneme probabilities.

According to some embodiments, different encoders and acoustic models can operate at different sampling rates or bit depths. This can be useful if, for example, an encoder operates with high accuracy on raw input audio but transmits compressed audio over a bandwidth-limited connection to an acoustic model or if a phrase spotter captures audio at a low sampling rate to save power and that audio segment is used to compute the sound embedding while the sampling rate is increased for the acoustic model to run on the utterance speech.

In addition to applications on a per-query basis in general-purpose virtual assistants, automotive control systems, and other voice user interfaces, acoustic model conditioning on sound embedding can also be useful in dictation systems. Dictation systems may recompute and store a sound embedding whenever they detect a key phrase. This can improve recognition continuously after the key phrase until the end of a session or when another key phrase is captured.

A key phrase can be a common command such as "period," "new line," or "undo that." In general, it is important to have a high accuracy of having detected the key phrase. Since long words have greater certainty in speech recognition, it is possible to use the audio spoken during any word that is over a certain length such as 10 phonemes. It is also possible to condition the storing of a new sound embedding on a recognition probability score exceeding a threshold.

The computing and storing of updated sound embeddings may occur silently and invisibly to users of dictation systems. It may also be an optional feature that users can select.

Acoustic models can utilize various training methods to learn from data. An example of the learned model is through neural networks, even though other statistical models such as hidden Markov models (HMM) can also be adopted.

Because of the improved accuracy of acoustic models conditioned on sound embeddings, for a given target accuracy, such as a target word error rate, it is possible to achieve the target with less training time, fewer training iterations, and/or less training data.

A key difference from a conventional acoustic model is that a conditional acoustic model has access to audio that includes voice, accent, and environmental information and is, in effect, "labeled" implicitly by the fact that it is speech of a known phrase.

Figure 5:
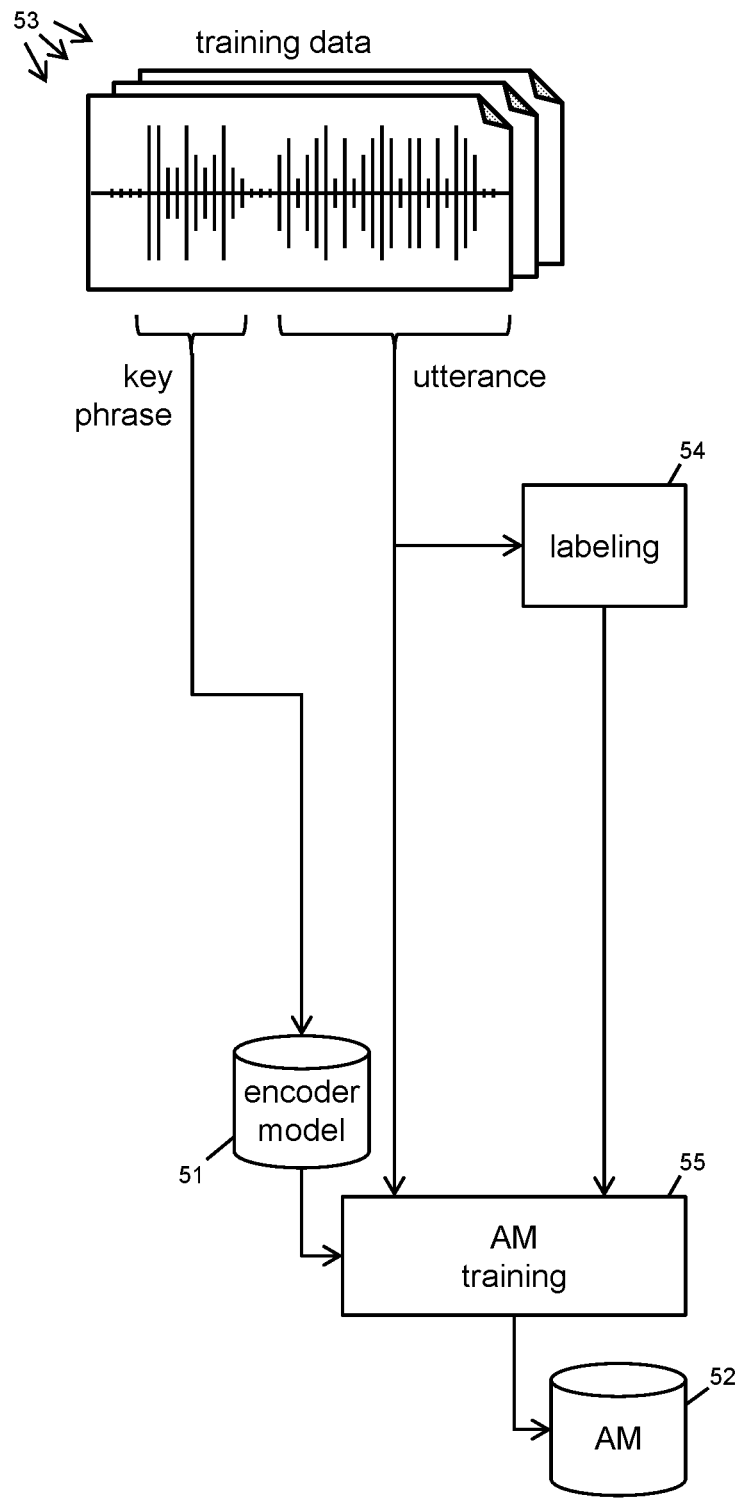
FIG. 5 shows a diagram of training an acoustic model conditional on a sound embedding according to an embodiment.

FIG. 5 shows a method of training an acoustic model according to some implementation of the present subject matter. It uses, as training data, speech recordings 53 that have both a key phrase speech segment and an utterance segment shortly following the key phrase. An utterance segment follows a key phrase shortly if the amount of time between the key phrase and the utterance is less than the amount of time that most people pause between asking a voice virtual assistant to wake up and giving it a command, such as 3 seconds or less. This amount of time can be stored in a memory. An encoder model 51 can process the key phrase speech segment to compute a sound embedding and store the computed sound embedding in a memory.

It is not strictly necessary, but many training systems use supervised learning on labeled data. In such a case, the utterance audio is labeled 54. Labeling typically involves humans listening to utterances, checking that a machine transcription is correct, and entering a correct transcription if the machine transcription is incorrect. Human labelers tend to enter labels using human-readable text. That is then converted to sequences of phonemes. For homograph-heterophones, the correct phonemes may be chosen from context, or such samples may be excluded from training. Regardless of the approach, the input to acoustic model training 55 is a ground truth sequence of phonemes from labeling, audio samples, or spectral values time-aligned to match the phonemes and the sound embedding. In other words, in the training data for acoustic models, audio samples or spectral values time-aligned to match the phonemes are labeled with the correct phonemes and the sound embedding. The result of training is an acoustic model 52 that can perform inference on input speech audio, using a sound embedding, more accurately than could an acoustic model trained without sound embeddings.

As with any trained model, the trained acoustic model 52 will be most accurate if the corpus of training data 53 is diverse and spans the range of speech that the model will encounter in real usage.

Encoders that compute sound embeddings may be implemented with digital signal processing algorithms. They may also be statistical models learned from data. They may, specifically, be implemented using neural networks. An encoder neural network may include one or more of convolutional layers, recurrent nodes, long-term recurrent nodes such as LSTMs or GRUs, and at least one "deep" feedforward layers.

According to some embodiments, an encoder neural network can be trained to learn an embedding space that gives a diverse range of sound embeddings on key phrase audio. That may be performed independently of a conditional acoustic model. Independent training can be a good approach if it is performed by different teams or companies or as part of different projects or for different performance requirements such as an encoder being optimized for low-power embedded systems and an acoustic model being optimized for high-performance cloud computing data centers.

Figure 6:
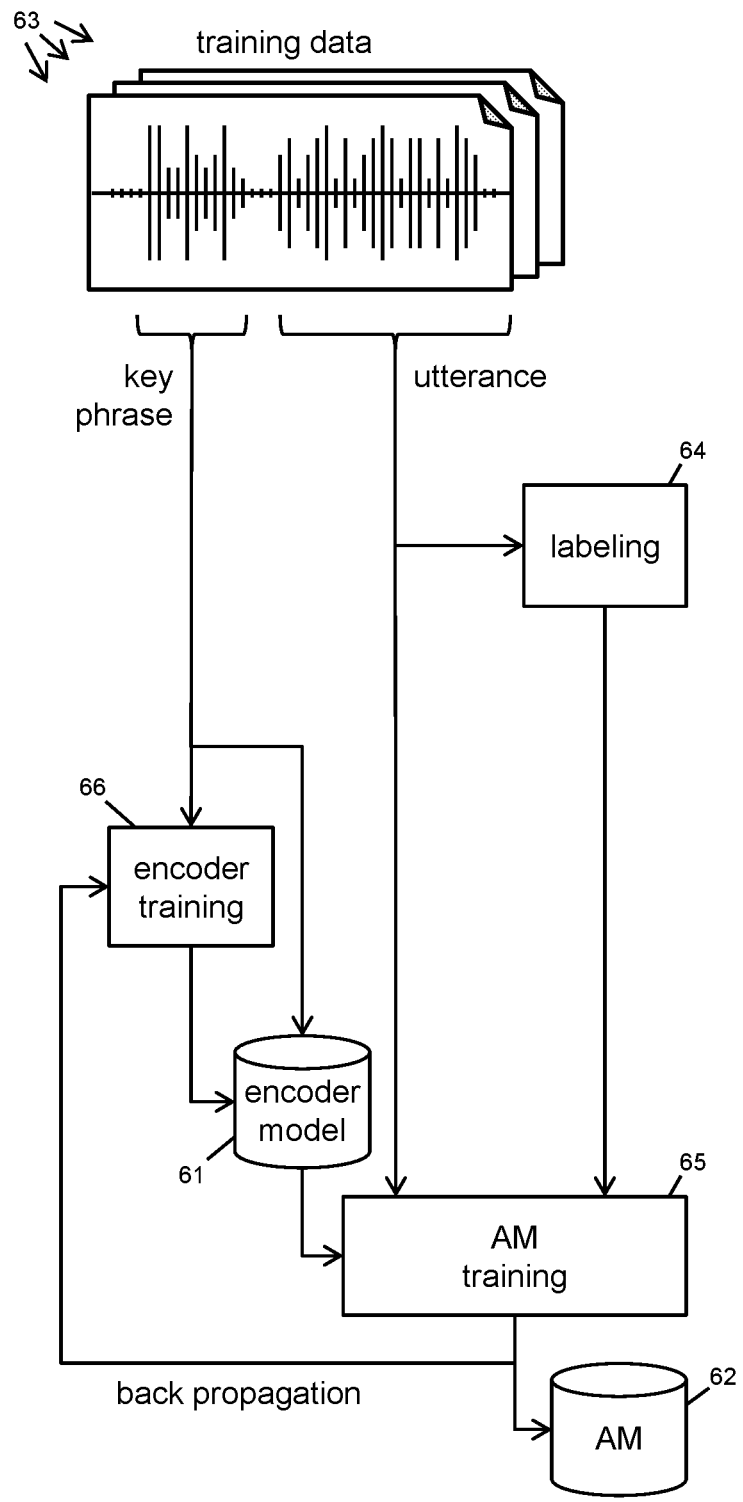
FIG. 6 shows a diagram of jointly training an encoder and an acoustic model conditional on a sound embedding according to an embodiment.

According to some embodiments, an encoder model can be jointly trained with a conditional acoustic model. FIG. 6 shows joint training of an encoder model and conditional acoustic model. As described above for independent acoustic model training, the training begins with a corpus of training data 63. The training data samples each contain a key phrase shortly followed by an utterance. The utterance audio segments are labeled 64. The key phrase audio is encoded by an encoder model 61, and the resulting sound embedding is used with their corresponding utterance audio segments and ground truth labels to perform an iteration of training 65. The training iteration computes gradients for parameters within the acoustic model 62 according to a cost function and backpropagates the gradients through the model. The gradients are then backpropagated to a training process for the encoder model 66, which updates the parameters of the encoder model 61. By running for many iterations, the encoder model learns to create sound embeddings that are more useful for the conditioning of the acoustic model, and the acoustic model learns to use the sound embeddings to achieve better accuracy than if the models had been trained independently.

Many ASR systems apply a language model to the hypothesized phoneme sequences from an acoustic model. Some experimental systems use jointly trained acoustic and language models or unitary neural networks that infer text directly from segments of speech audio. Conditioning such as "end-to-end" speech recognition neural networks on a sound embedding computed from key phrase audio can improve overall accuracy. This is because a neural network that learns to exclude the voice, accent, and environmental information in a sound embedding from a signal that includes that with phoneme information can also benefit by excluding that information from the inference of higher-level features that relate to the inference of words from audio.

Acoustic models trained on clean speech audio have accuracy in real-world noisy speech audio that is inferior to models trained on noisy speech. However, collecting training data that accurately represents the expected noise conditions of ASR for products not yet built or released to market is difficult. A common technique is to mix noise with relatively clean speech audio to condition training audio data. This can be done by mixing speech audio with recordings of noise, applying intentional distortion through signal processing, synthesizing effects such as reverberation, and similar techniques to model real-world conditions.

A conditional acoustic model benefits from having a sound embedding that represents noise and distortions likely to be present in real-world utterance audio. The likelihood is high because the sound embedding is computed from audio shortly followed by the utterance to be recognized. This has the benefit of providing environmental information such as noise and distortion to the acoustic model. As a result, to optimize the joint training of an encoder and conditional acoustic model, it is important to mix the same profile of noise or distortion into both the key phrase and the utterance audio. The mixed noise doesn't need to be identical between the key phrase and the utterance, but it should have the same profile. That is, it should be generated by the same recipe or from a single recorded session of continuous noise.

Figure 7:
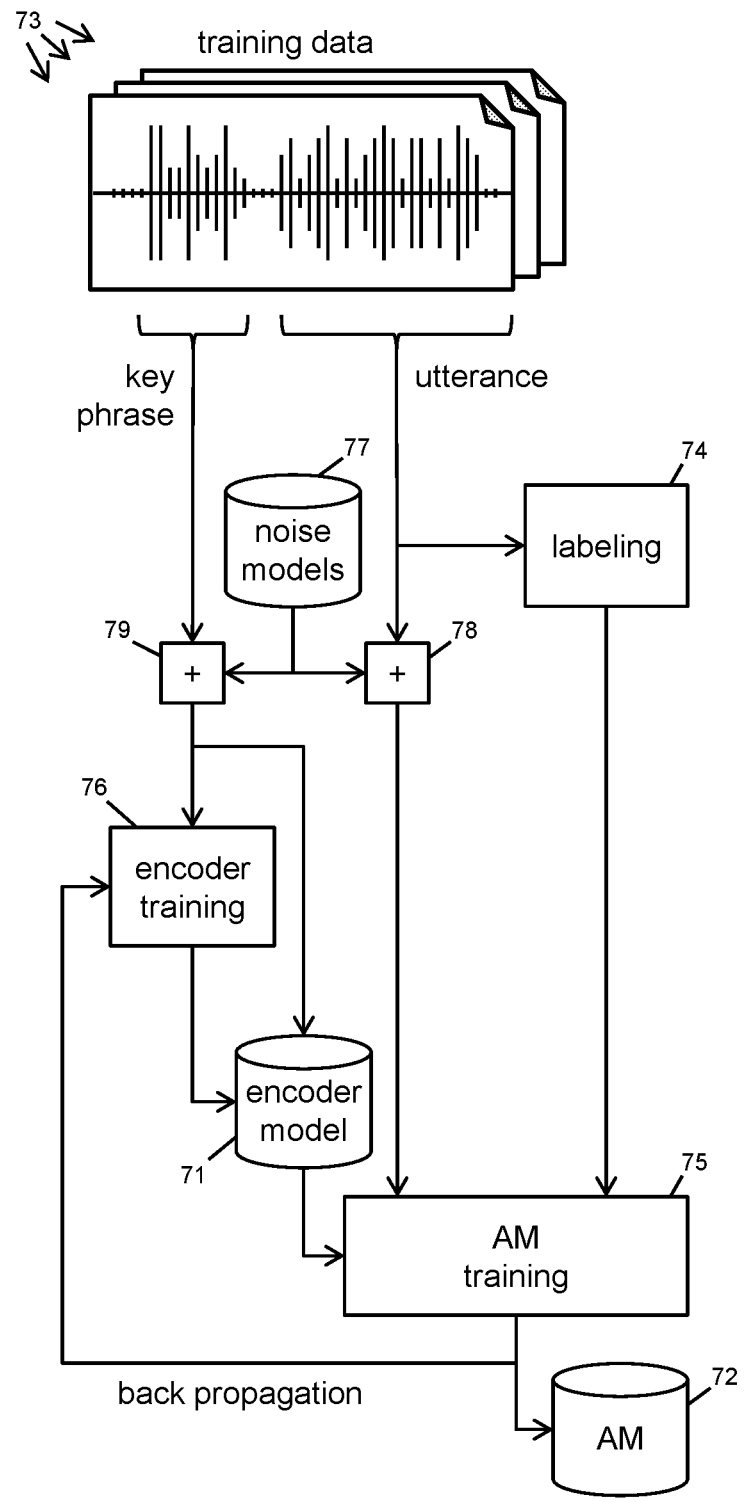
FIG. 7 shows a diagram of jointly training an encoder and an acoustic model conditional on a sound embedding using training data mixed with noise according to an embodiment.

FIG. 7 shows joint training of an encoder model and conditional acoustic model with noise mixed into the training. It uses a corpus of training data 73 that includes samples of speech audio segments with both a key phrase shortly followed by a spoken utterance. The utterance audio segments are labeled 74. A noise model 77 produces noise that is mixed with the utterance speech segment 78 and the key phrase speech segment 79. The key phrase with mixed noise is used for the encoder training 76 and used by the encoder model 71 to compute a sound embedding. The sound embedding and labels are applied with the noise-mixed utterance speech segments in the acoustic model training process 75 to produce a trained conditional acoustic model 72.

The acoustic model training 75 computes gradients and backpropagates them to the encoder training 76 to jointly train the encoder model 71 and conditional acoustic model 72 with each training iteration.

Figure 8:
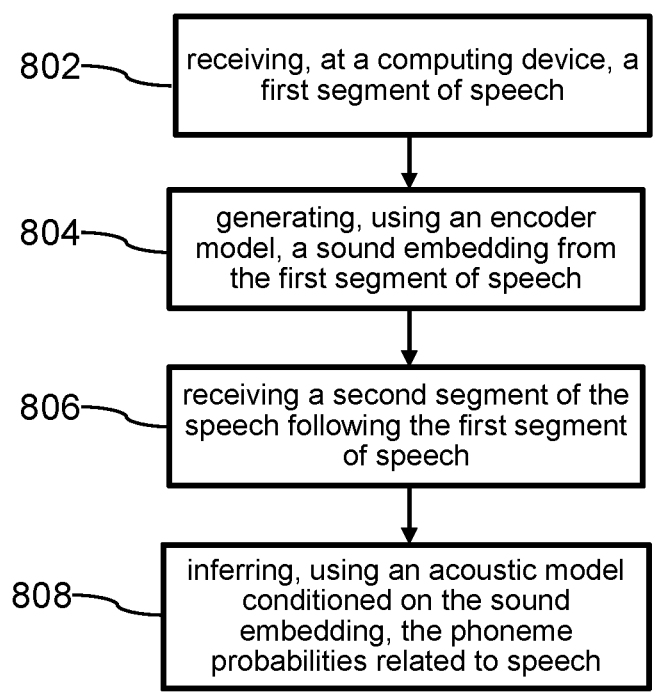
FIG. 8 is an exemplary flow diagram illustrating aspect of a method having feature consistent with some implementations of the present subject matter.

FIG. 8 is an exemplary flow diagram 800 illustrating aspect of a method having feature consistent with some implementations of the present subject matter. At step 802, a computing device can receive a first segment of a speech. The first segment corresponding to a key phrase or a wake phrase with a known sequence of phonemes. Sometimes, such a phrase is received by a phrase spotter. Phonemes are small units of speech that can distinguish one word or word element from another, such as the element "i" in "tip," to differentiate the word from "top" or "tap." Examples of key phrases are "Okay Google" or "Alexa." In automatic dictation, key phrases can be, for example, "period," "new line," and "undo that."

The computing device can be any device that is capable of receiving audio data with a microphone or audio receiver for the application of human voice control or interface. Examples of such computing devices can be a smart speaker, a virtual assistant device, a mobile device, a personal computer, a virtual headset, or a smart wearable device.

At step 804, upon receiving and detecting the key phrase, an encoder model can generate a sound embedding from the key phrase. A sound embedding is a lower dimensional representation of the original audio data with only the most relevant or interesting attributes for specific applications. According to some embodiments, the sound embedding is a filtered representation of the original audio data which only focuses on the non-phoneme information features or vectors of the key phrase, such as voice, noise, accent, and environmental attributes. According to some embodiments, the encoded sound embedding can be stored immediately in a memory device following the end of the key phrase.

An encoder model can be a neural network, a statistical module, an algorithm or program configured to process, transform, or compress audio data into lower dimensional representation as a sound embedding. An encoder model can run locally on the computing device or run on a remote server in association with the ASR system. The encoder model can operate on a segment of audio beginning at, shortly before, or shortly after a time when a voice activity detector (VAD) triggers as detecting speech until a time at, shortly before, or shortly after a key phrase is triggered.

According to some embodiments, the ASR system can utilize one or more encoder models. For example, a general sound embedding encoder model can be useful across many applications or languages, and modular encoders can be used to improve accuracy for specific applications or languages.

According to some embodiments, the encoder model can be implemented through digital signal processing algorithms. According to other embodiments, the encoder model can be statistical models learned from data. For example, the encoder model can be implemented using neural networks. An encoder neural network may include one or more of convolutional layers, recurrent nodes, long-term recurrent nodes such as LSTMs or GRUs, and at least one or two "deep" feed-forward layers.

According to some embodiments, an encoder neural network can be independently trained to learn an embedding space that gives a diverse range of sound embeddings on key phrase audio. Independent training from that of a conditional acoustic model can be a good approach if it is performed by different teams or companies or as part of different projects or for different performance requirements such as an encoder being optimized for low-power embedded systems and an acoustic model being optimized for high-performance cloud computing data centers. According to some embodiments, an encoder model can be jointly trained with a conditional acoustic model. According to some embodiments, an encoder model can be trained with noise mixing to improve the accuracy of the key phrase recognition.

At step 806, the computing device can receive a second segment of speech following the first segment of speech. Shortly following the first segment of speech, the second segment can contain an audio signal of an utterance that is a speech of unknown words and phonemes. As the second segment of speech accompanies the first segment of speech, its corresponding audio signal can also be mixed with non-phoneme information such as the voice, noise, accent, and environmental information similar to those of the first segment of speech.

At step 808, an acoustic model conditioned on the sound embedding can infer the phoneme probabilities of the second segment of speech. An acoustic model can be a neural network, a statistic module, an algorithm, or program method with the objective to infer the phoneme probabilities in speech audio. Acoustic models are key components of some ASR systems. According to some embodiments, the acoustic model can take inputs of the second segment of speech audio and the encoded sound embedding. The acoustic model can generate phonemes as outputs. According to some embodiments, each of a set of phonemes can be a SoftMax set of probabilities.

According to some embodiments, the acoustic model can compute convolutions of input features to take advantage of the information at different levels of granularity that can improve inference accuracy. The acoustic model can employ recurrence, such as LSTM or GRU neural network nodes, to take advantage of the information contained in temporal variations of input signals.

A conditional acoustic model can be an acoustic model conditioned on a sound embedding with the objective to provide high accuracy in ASR of users' utterances. According to some embodiments, a conditional acoustic model can reject or filter non-phoneme information features such as voice, accent, and environmental information from utterance audio and outputs only the spoken phoneme probabilities. Accordingly, the conditional acoustic model can discriminate features of the utterance audio that indicate phoneme information and generate phoneme probabilities with increased accuracy.

According to some embodiments, the acoustic model can be trained on labeled samples of speech audio, each of the labeled samples comprising the corresponding sound embedding encoded by the encoder model. Each of the labeled samples can further comprise a first training segment of the key phrase and a second training segment of the utterance. Furthermore, the labeled samples can include a multiplicity of voices mixed with a multiplicity of noise profiles. Labeling can involve humans listening to utterances, checking that a machine transcription is correct, and entering a correct transcription if the machine transcription is incorrect. The acoustic model can be more accurate when the training data is diverse and covers a broad range of scenarios that would likely happen in real usage.

According to some embodiments, the acoustic model can be jointly trained with the encoder model. According to some embodiments, a corpus of training data, each containing a key phrase shortly followed by an utterance, can be utilized to train both models. The utterance audio segments are labeled as described herein. The key phrase audio is encoded by an encoder model to generate the resulting sound embedding. The sound embedding, the corresponding utterance audio segment, and ground truth labels can be combined to perform an iteration of training. The training iteration can compute gradients for parameters within the acoustic model according to a cost function and backpropagates the gradients through the model. The gradients are then backpropagated to a training process for the encoder model, which updates the parameters of the encoder model. By running for numerous iterations, the encoder model can learn to create sound embeddings that are more useful for the conditioning of the acoustic model, whereas the acoustic model can learn to use the sound embeddings to achieve better accuracy than if the two models had been trained independently.

According to some embodiments, the encoder model and conditional acoustic model can be jointly trained with noise mixed into the training. The mixed noise can have the same profile and can be mixed into the key phrase audio and the utterance audio.

Figure 9:
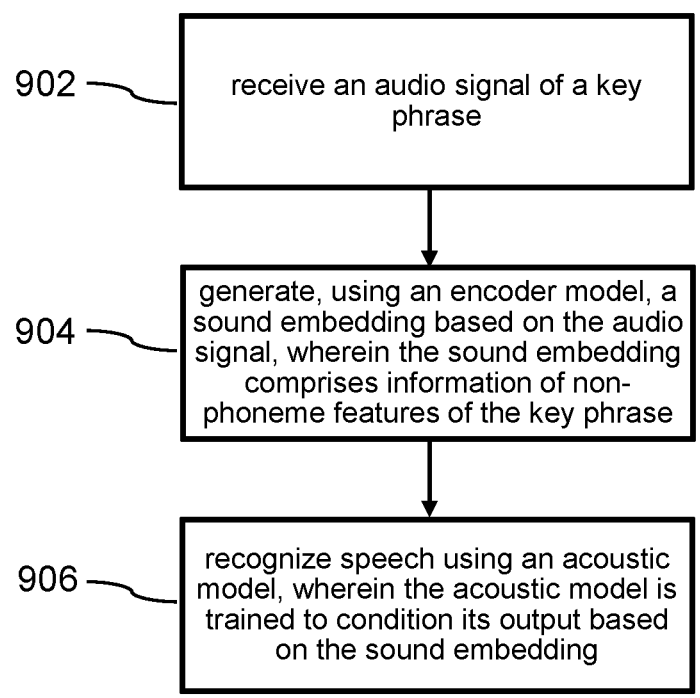
FIG. 9 is another exemplary flow diagram illustrating aspect of a speech recognition system having feature consistent with some implementations of the present subject matter.

FIG. 9 is another exemplary flow diagram 900 illustrating aspect of a speech recognition system having feature consistent with some implementations of the present subject matter. At step 902, a speech processing system can receive an audio signal of a key phrase via a computing device such as a virtual assistant. At step 904, an encoder model can generate a sound embedding based on the audio signal based on the non-phoneme feature information of the key phrase. At step 906, an acoustic model that has been trained to condition its output based on the sound embedding can recognize speech by inferring a plurality of phoneme probabilities in an utterance following the key phrase.

Many computerized systems can use conditional acoustic models for high-accuracy ASR. Some examples are servers, such as cloud servers, that perform ASR, embedded systems, Internet of Things (IoT) devices, mobile phone or other portable handset devices, personal computer dictation systems, voice control systems for automobiles and other vehicles, and retail vending systems and devices. The following section will describe some examples to illustrate relevant features that may apply to various other applications.

Some systems, such as home smart speakers, use a client-server approach. The smart speaker device may include the encoder functionality. When it captures audio of a user saying a wake phrase, that is taken as the key phrase audio, encoded, and sent to a server. The server may provide services such as ASR, natural language understanding (NLU), requesting data from third-party application programming interfaces (API), and returning of commands to the device.

Figure 10:
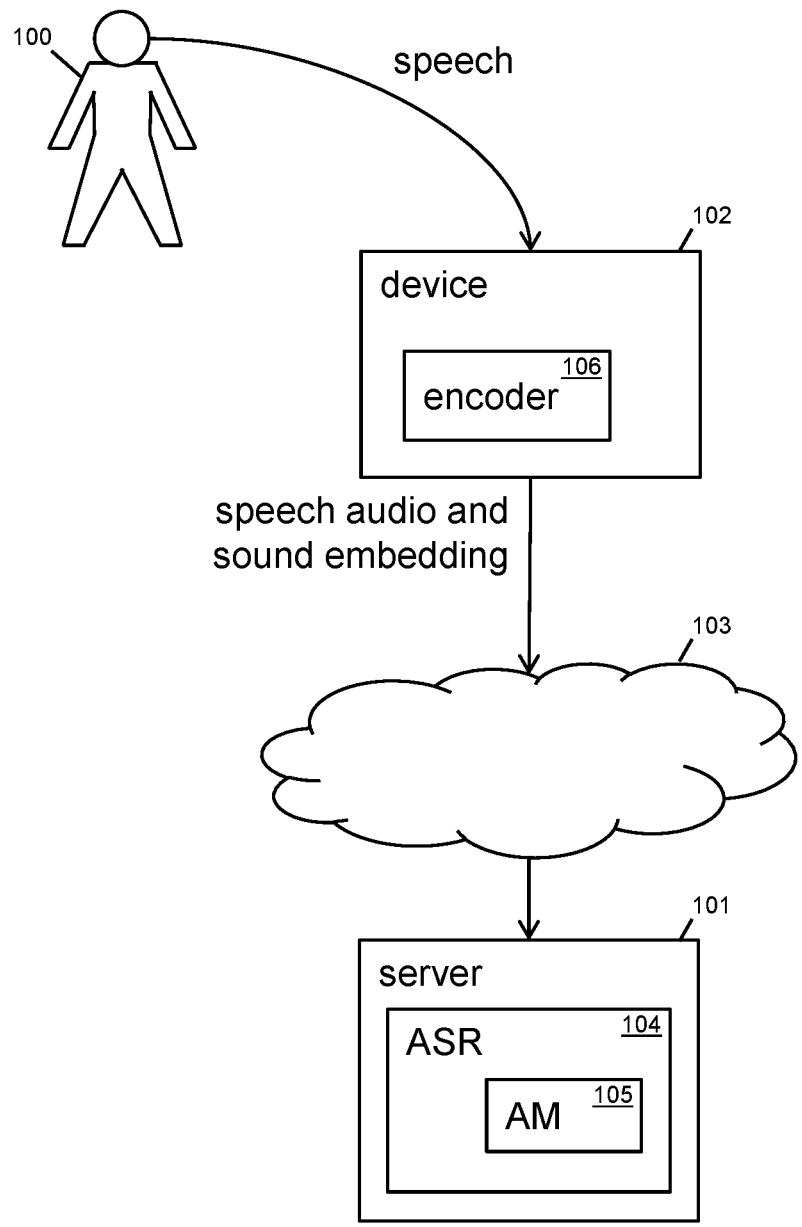
FIG. 10 shows a diagram of a device with an encoder providing a vector to condition an acoustic model on a cloud server according to an embodiment.

FIG. 10 shows a user 100 communicating with a device 102 coupled, as a client, through a network 103 to a server 101 according to an embodiment. The device 102 receives speech audio of a key phrase shortly followed by an utterance. The device 102 processes the key phrase audio by an encoder 106 implemented in software to compute a sound embedding from the key phrase audio. The device 102 stores the sound embeddings in a memory and then proceeds to transmit the stored sound embedding to the server 101, capture utterance audio from the speech, and transmit the utterance audio to the server 101. The server 101 proceeds to perform ASR 104 using a conditional acoustic model 105 all implemented in software on a high-performance processor. The conditional acoustic model 105 uses the sound embedding that the device 102 sent.

It can be beneficial to encode the sound embeddings on the device in case different devices use different encoders based on their computing capabilities. For example, wall-plugged devices like smart speakers are usually able to sustain greater processing performance then battery-powered portable devices like smartphones. Running encoders on devices can also be beneficial because, by doing so, it is not necessary to transmit the key phrase audio over the network to the server.

According to some embodiments, the ASR system can implement functionality equivalent to the encoder 106, ASR 104, and conditional acoustic model 105 within a device local to a user. Doing so can be beneficial because the device can thereby perform speech recognition without an internet connection. This is important for automobiles, which may drive to places without a mobile wireless network connection or mobile devices that users may turn to "airplane mode" during travel or to maintain privacy.

According to some embodiments, the ASR system has dual-mode systems that transmit sound embeddings and utterance audio to a server when a network connection is available but switch to a mode of local ASR when no network connection is available.

According to some embodiments, the ASR system can perform the functionality of the encoder 106, ASR 104, and conditional acoustic model 105 on a server. To do so requires that the audio of the key phrase be sent from the client to the server for the encoder functionality to process. This can be an advantage so that the server operator can easily upgrade the encoder or conditional acoustic model. It can also be an advantage because servers generally have much more processing capability than client devices and so it is easier to design a system with dumb clients that simply pass audio to a server without the complexities of a local encoder.

Figure 11A:
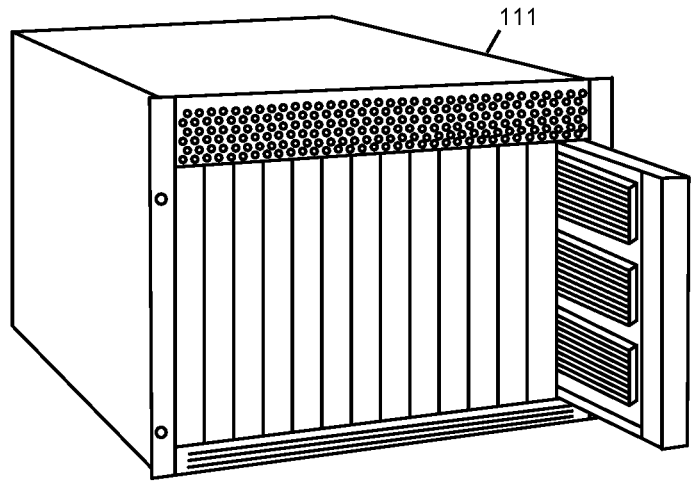
FIG. 11A shows a cloud server according to an embodiment.

FIG. 11A shows a picture of a server system 111 in a data center with multiple blades.

Figure 11B:
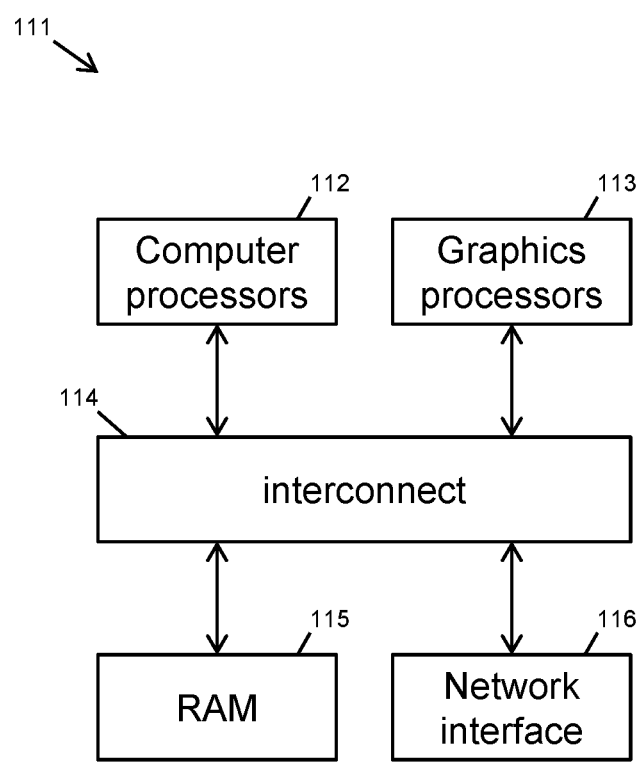
FIG. 11B shows a diagram of a cloud server according to an embodiment.

FIG. 11B is a block diagram of functionality in server systems that can be useful for conditioning acoustic models on sound features. Server system 111 comprises one or more clusters of central processing units (CPU) 112 and one or more clusters of graphics processing units (GPU) 113. Various implementations may use either or both of CPUs and GPUs for either or both of inference and training. According to some embodiments, the ASR system can use field programmable gate arrays (FPGA), application specific integrated circuits (ASIC), tensor processing units (TPU) or other co-processors, accelerators, or specialized devices.

The CPUs 112 and GPUs 113 are connected through an interconnect 114 to random access memory (RAM) devices 115. RAM devices can store temporary data values such as sound embeddings, software instructions for CPUs and GPUs, parameter values of neural networks or other models, audio data, operating system software, and other data necessary for system operation.

The server system 111 further comprises a network interface 116 connected to the interconnect 114. The network interface 116 transmits and receives data from remote client devices such as sound embeddings, speech audio of utterances and, in some cases, key phrases, and other data necessary for system operation.

Figure 12:
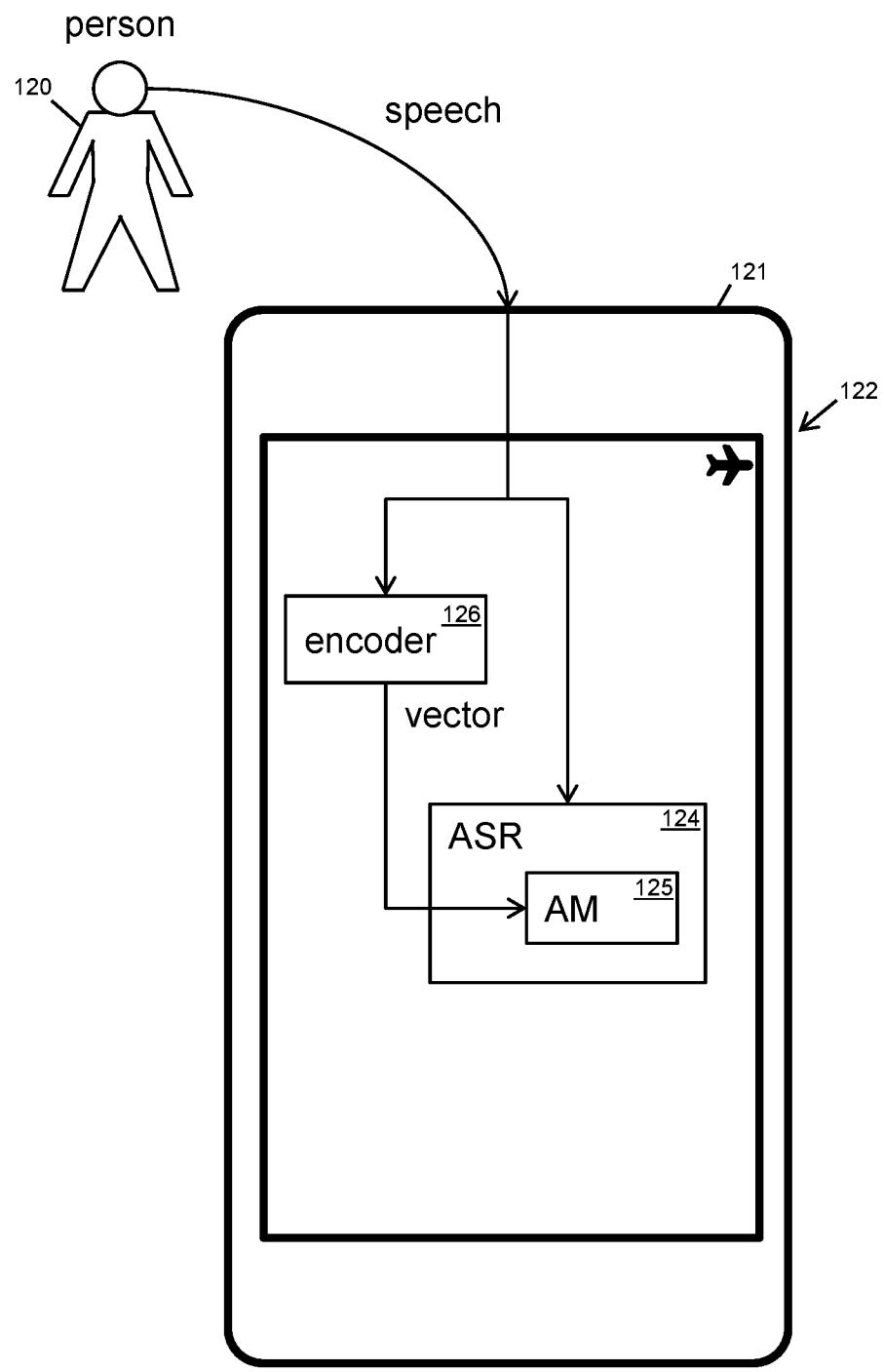
FIG. 12 shows a mobile handset with an encoder and conditional acoustic model for local speech recognition according to an embodiment.

As described above, many types of devices may present speech-controlled interfaces to users. FIG. 12 shows one example that is a mobile phone. A user 120 provides speech audio to a mobile phone 121. Mobile phone 121 is in airplane mode, as indicated by an icon 122 that looks like an airplane.

Mobile phone 121 includes an encoder 126 that receives speech audio and encodes a sound embedding from the speech audio of the key phrase. The mobile phone 121 further includes an ASR function 124 that receives the speech audio and the sound embedding. ASR function 124 includes an acoustic model 125 that uses the sound embedding to infer phoneme probabilities from the speech audio.

As a result, the mobile phone can recognize user speech and perform local functions such as opening apps or playing music or movies stored in device RAM.

Figure 13A:
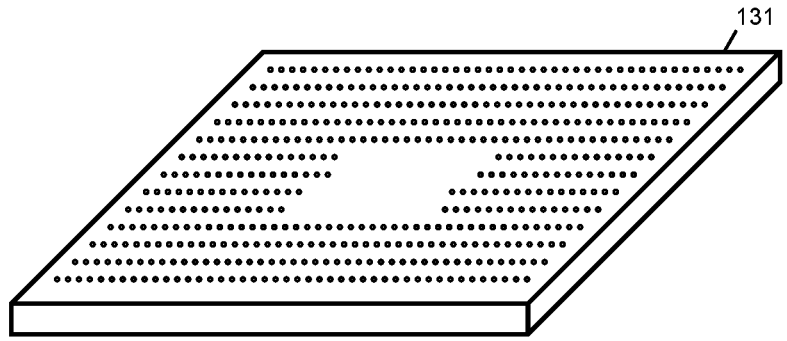
FIG. 13A shows a packaged system-on-chip according to an embodiment.

Many embedded devices, IoT devices, mobile devices, and other devices with direct user interfaces are controlled and have ASR performed by SoCs. SoCs have integrated processors and tens or hundreds of interfaces to control device functions. FIG. 13A shows the bottom side of a packaged system-on-chip device 131 with a ball grid array for surface-mount soldering to a printed circuit board. Various package shapes and sizes can be utilized for various SoC implementations.

Figure 13B:
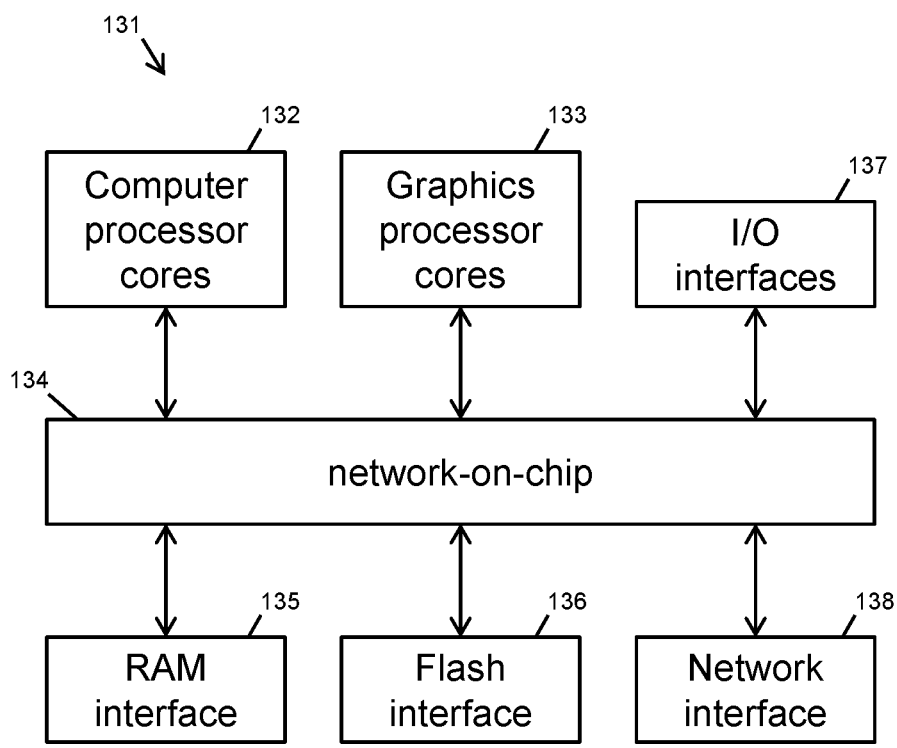
FIG. 13B shows a diagram of a system-on-chip according to an embodiment.

FIG. 13B shows a block diagram of the system-on-chip 131. It comprises a multicore cluster of CPU cores 132 and a multicore cluster of GPU cores 133. The processors connect through a network-on-chip 134 to an off-chip dynamic random access memory (DRAM) interface 135 for volatile program and data storage for data such as sound embeddings and a Flash interface 136 for non-volatile storage of computer program code in a Flash RAM non-transitory computer readable medium. SoC 131 may also have a display interface (not shown) for displaying a graphical user interface for functions such as displaying an ASR transcription to a user or displaying the results of a virtual assistant command and an I/O interface module 137 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 131 also comprises a network interface 138 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 135 or Flash devices through interface 136, the CPUs 132 and GPUs 133 perform steps of methods as described herein.

Program code, data such as sound embeddings, audio data for key phrases and utterances, operating system code, and other necessary data are stored by non-transitory computer-readable media.

Figure 14:
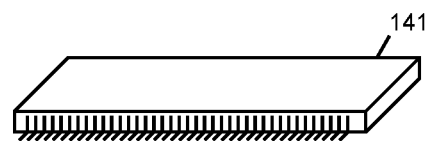
FIG. 14 shows a non-transitory computer-readable medium according to an embodiment.

FIG. 14 shows an example computer readable medium 141 that is a Flash random access memory (RAM) chip. Data centers commonly use Flash memory to store data and code for server processors. Mobile devices commonly use Flash memory to store data and code for processors within SoCs. Non-transitory computer readable medium 141 stores code comprising instructions that, if executed by one or more computers, would cause the computers to perform steps of methods described herein. Other digital data storage media can be appropriate in various applications.

Examples shown and described use certain spoken languages. Various implementations operate, similarly, for other languages or combinations of languages. Some implementations are screenless, such as an earpiece, which has no display screen. Some implementations are stationary, such as a vending machine. Some implementations are mobile, such as an automobile. Some implementations are portable, such as a mobile phone. Some implementations may be implanted in a human body. Some implementations comprise manual interfaces such as keyboards or touchscreens. Some implementations comprise neural interfaces that use human thoughts as a form of natural language expression.

Some implementations function by running software on general-purpose CPUs such as ones with ARM or x86 architectures. Some power-sensitive implementations and some implementations that require especially high-performance use hardware optimizations. Some implementations use application-customizable processors with configurable instruction sets in specialized systems-on-chip, such as ARC processors from Synopsys and Xtensa processors from Cadence. Some implementations use dedicated hardware blocks burned into FPGAs. Some implementations use arrays of GPUs. Some implementations use ASICs with customized logic to give the best performance. Some implementations are in hardware description language code such as code written in the language Verilog.

Descriptions herein reciting principles, features, and embodiments encompass structural and functional equivalents thereof. Practitioners skilled in the art will recognize many modifications and variations.

What is claimed is:

1. A computer-implemented method of inferring phoneme probabilities in speech audio, the method comprising:
   receiving, at a computing device, speech from a user, wherein the speech comprises a first segment of speech including a key phrase with known phonemes and a following second segment of speech;
   generating, using an encoder model, a sound embedding based on non-phoneme features of the key phrase from the first segment of speech; and
   inferring, using an acoustic model conditioned on the sound embedding, phoneme probabilities related to the following second segment of speech.

2. The computer-implemented method of claim 1, further comprising:
   determining the key phrase with known phonemes as the first segment of speech.

3. The computer-implemented method of claim 2, further comprising:
   determining the following second segment of speech.

4. The computer-implemented method of claim 1, wherein the non-phoneme features comprises at least one of voice, noise, accent, and environmental attributes associated with the first segment of speech.

5. The computer-implemented method of claim 1, further comprising:
   storing the sound embedding in a memory device associated with the computing device.

6. The computer-implemented method of claim 1, wherein the acoustic model is trained on labeled samples of speech audio, each of the labeled samples having a corresponding sound embedding.

7. The computer-implemented method of claim 6, wherein the labeled samples include a multiplicity of voices mixed with a multiplicity of noise profiles, wherein the first segment and the following second segment are mixed with the same noise profile for each sample.

8. The computer-implemented method of claim 1, wherein the encoder model is jointly trained with the acoustic model.

9. The computer-implemented method of claim 1, further comprising:
   generating, using a second encoder model, a second sound embedding from the first segment of the speech, wherein the acoustic model is further conditioned on the following second sound embedding to infer the phoneme probabilities related to the following second segment of speech.

10. A computer-implemented method of conditioning an acoustic model for speech recognition, the method comprising:
    receiving, at an acoustic model, a sound embedding comprising non-phoneme features of a first segment of speech from a user, wherein the first segment of speech including a key phrase with known phonemes;
    receiving a second segment of speech following the first segment of speech; and
    inferring, using the acoustic model, phoneme probabilities of the second segment of speech.

11. The computer-implemented method of claim 10, further comprising:
    training the acoustic model by conditioning its output based on the sound embedding.

12. The computer-implemented method of claim 10, further comprising:
    extracting the non-phoneme features comprising at least one of voice, noise, accent, and environmental attributes associated with the first segment of speech.

13. The computer-implemented method of claim 10, further comprising:
    generating, using an encoder model, the sound embedding based on an audio signal of the first segment of speech, wherein the first segment of speech corresponds to a key phrase with known phonemes.

14. The computer-implemented method of claim 13, further comprising:

training the encoder model jointly with the acoustic model based on the sound embedding.

15. The computer-implemented method of claim 10, further comprising:

generating, using a second encoder model, a second sound embedding from the first segment of speech, wherein the acoustic model is further trained on the second sound embedding to infer the phoneme probabilities related to the second segment of speech.

16. The computer-implemented method of claim 10, wherein the acoustic model is trained on labeled samples of speech audio, each of the labeled samples having a corresponding sound embedding.

17. The computer-implemented method of claim 16, wherein the labeled samples include a multiplicity of voices mixed with a multiplicity of noise profiles, wherein the first segment and the second segment are mixed with the same noise profile for each sample.

18. A computerized speech processing system, the system being configured to:

receive, at a computing device, speech from a user, wherein the speech comprises a first segment of speech including a key phrase with known phonemes and a following second segment of speech;

generate, using an encoder model, a sound embedding based on non-phoneme features of the key phrase from the first segment of speech; and infer, using an acoustic model conditioned on the sound embedding, phoneme probabilities related to the following second segment of speech.

19. The computerized speech processing system of claim 18, further comprising:

determine the key phrase with known phonemes as the first segment of speech; and determine the following second segment of speech.

20. The computerized speech processing system of claim 18, wherein the non-phoneme features comprises at least one of voice, noise, accent, and environmental attributes associated with the first segment of speech.

* * * * *